(12) United States Patent
Höfelsauer

(10) Patent No.: US 6,278,347 B1
(45) Date of Patent: Aug. 21, 2001

(54) SWITCH FOR THE CONTROL OF A SHUT-OFF OF A BELT LOCK

(75) Inventor: Herbert Höfelsauer, München (DE)

(73) Assignee: Autoliv Development AB, Vargada (SE)

( * ) Notice: Subject to any disclaimer, the term of this patent is extended or adjusted under 35 U.S.C. 154(b) by 0 days.

(21) Appl. No.: 09/150,955

(22) Filed: Sep. 10, 1998

(30) Foreign Application Priority Data

Sep. 11, 1997 (DE) .............................................. 197 39 971

(51) Int. Cl.[7] .................................................... H01H 9/00
(52) U.S. Cl. ........................................ 335/205; 340/457.1
(58) Field of Search .................................. 340/457.1, 551, 340/552; 73/865.9; 242/107; 180/268; 335/205–207

(56) References Cited

U.S. PATENT DOCUMENTS

| | | | |
|---|---|---|---|
| 5,590,904 | 1/1997 | Ellis et al. .............................. | 280/735 |
| 5,689,421 | 11/1997 | Görnig ........................... | 364/424.055 |
| 5,742,986 * | 4/1998 | Corrion et al. ......................... | 24/633 |
| 5,752,299 * | 5/1998 | Vivacqua et al. ....................... | 24/633 |
| 5,898,366 * | 4/1999 | Brown et al. ...................... | 340/457.1 |
| 5,944,135 * | 8/1999 | Blackburn et al. .................. | 180/628 |
| 6,014,091 * | 1/2000 | Noltemeyer et al. .................... | 341/7 |

FOREIGN PATENT DOCUMENTS

| | | | |
|---|---|---|---|
| 3908993 | 9/1990 | (DE) | B60R/22/48 |
| 4308038 | 9/1994 | (DE) | H01H/36/00 |
| 4327989 | 3/1995 | (DE) | B60R/22/48 |
| 4338485 | 5/1995 | (DE) | B60R/22/48 |
| 4441184 | 6/1995 | (DE) | B60R/21/16 |
| 2232775 | 12/1990 | (GB) | G01R/31/00 |

* cited by examiner

Primary Examiner—Lincoln Donovan
(74) Attorney, Agent, or Firm—Dilworth & Barrese LLP.

(57) ABSTRACT

The present invention concerns a switch device for verifying the locking position of an automobile seatbelt lock having at least two switch elements whose switch condition can be determined, as well as a control element that can be moved in the seatbelt lock and through which the switch condition of the switch elements can be changed. A switch device with high operating reliability is created by the fact that the switch elements are designed as sensors and the switch condition of the switch elements can be changed by an interaction between control element and sensors.

18 Claims, 2 Drawing Sheets

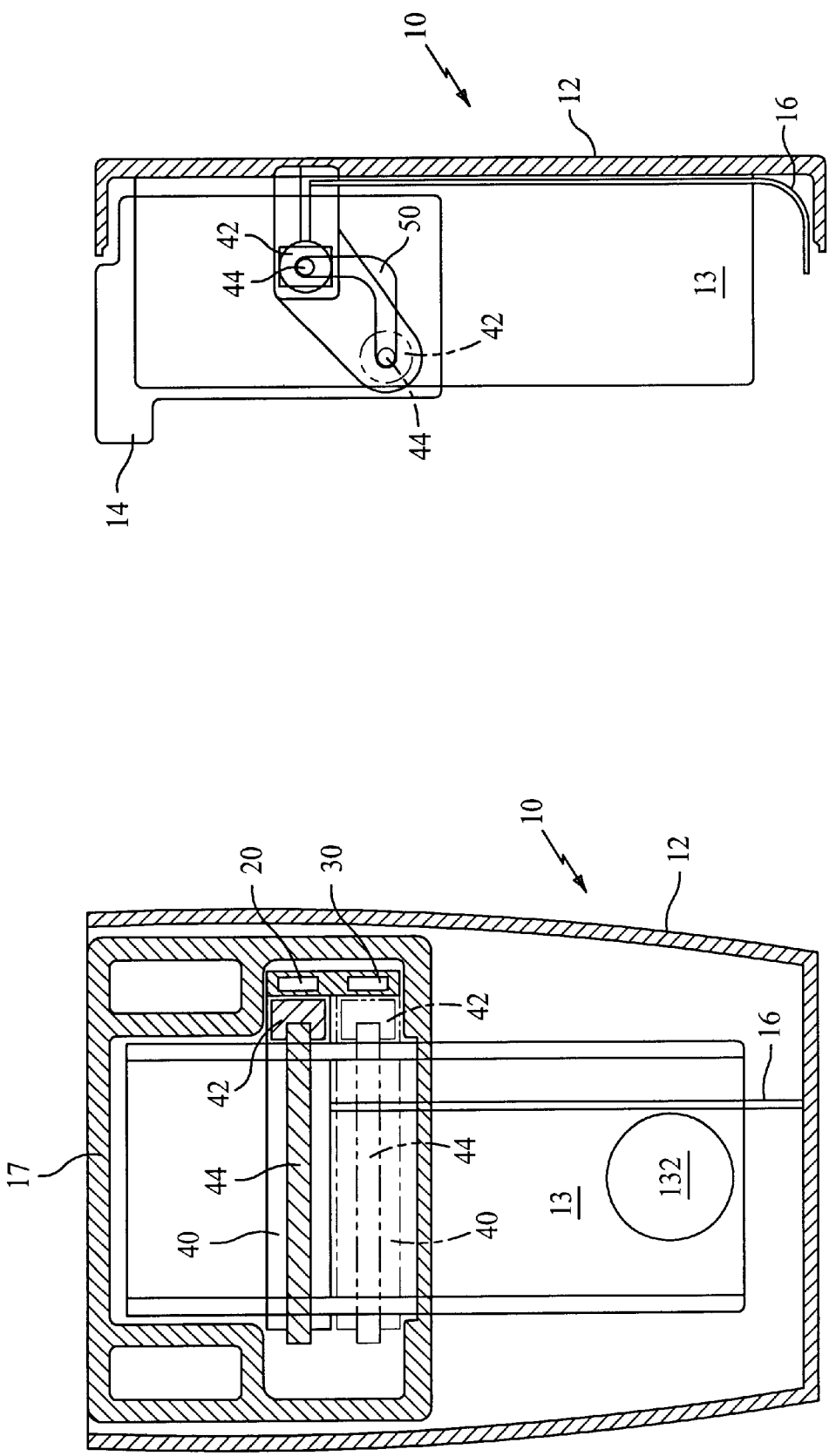

SWITCH FOR THE CONTROL OF A SHUT-OFF OF A BELT LOCK

BACKGROUND OF THE INVENTION

The present invention concerns a switch device for verifying the fastening of an automobile seatbelt lock with at least two switch elements whose switch condition can be determined, as well as a control component that can be moved in the seatbelt lock and through which the switch condition of the switch elements can be changed.

A generic switch device is known from, for example, DE 43 27 989. It discloses a buckle detection device that is positioned on the seatbelt of an automobile and which has two parallel guide arms in which resistors of various sizes are positioned. In the ends of the two guide arms there are changeover switches that are directly or indirectly moved mechanically when the belt tongue is inserted into and removed from the seatbelt lock and thereby release one or the other guide arm. Depending on whether the seatbelt tongue is inserted into the belt lock, the guide arm with the larger or the smaller of the resistors is activated, which activation can be determined by means of an appropriate resistance, tension, or current measurement. The monitoring of the mechanical function of the switch is achieved by the fact that the entire circuit is controlled in such manner that an undesired line break is determined when one of the switches locks in one position and thus cannot be moved. In this case neither of the guide arms is released, which leads to an undesired situation that can be determined in an evaluation component. By means of the evaluation component an error function of this type can lead to the transmitting of an appropriate signal for the user. It is likewise possible that in the presence of an error function or an unfastened condition of the seatbelt, a threshold value for a delay in the release of, for example, an airbag or a belt tightener in the event of occurrence of an accident can be appropriately lowered.

A similar arrangement is described in U.S. Pat. No. 5,590,904. The belt lock disclosed therein has a switch that can be opened by sliding the belt tongue into the belt lock. A resulting change in the resistance of a connected circuit is detected by an evaluation component that is connected with the safety equipment of the vehicle, for example an airbag or a belt tightener, and which controls their response in the event of a delay caused by an accident depending on the switch condition of the belt lock. DE 43 08 038 discloses a switch device for a belt lock in which the switch position can be changed by means of a permanent magnet and a ferromagnetic ground positioned in the area of the magnet. The ferromagnetic ground is located on a stationary contact spring element in a housing, which said element can be connected with one of two stationary contacts, depending on its position. The position of the contact spring element and hence a switch position is determined by the position of the permanent magnets, which said position depends on whether the belt tongue is properly gripped in the belt lock.

The disadvantage in the previously known switch devices is that mechanically operated switches are always used, which diminishes the reliability and security of the switch device.

It is the task of this invention to develop a generic switch device in such manner that its reliability is increased.

This task is performed by starting with a generic switch device, switch elements designed as sensors, and the switch condition of the switch elements changeable by means of an interaction between control element and sensors. In this way it is possible to create a reliable switch device in which the switch conditions are defined not by mechanically adjustable switches but by sensors whose switch condition can be changed by an interaction between the control element and the sensors. In this way disadvantages occurring for example with a locking of a mechanical switch in one position or with the corrosion or dirtying of switch points can be securely prevented.

It is particularly advantageous if the control element and the sensors are designed in such manner that a contact-free interaction between the control element and the sensors can be created. Such an embodiment of this invention leads to a situation in which there is no need for mechanical contact for the creation of signals indicating if the belt tongue is properly gripped in the belt lock. A contact-free interaction between the control element and the sensor is possible by means of, for example, a magnetic field. In contrast to mechanically activated switches, contact-free interaction facilitates reliable operation of the switch device even when manufacturing tolerances in the manufacturing of mechanical switches influence their functioning. Contact-free interaction between the control element and the sensor thus creates a situation in which neither the activation of the sensor itself nor a change in the switch status of the sensor is caused by a mechanical activation of an appropriate construction element. Instead, mechanical components can be eliminated, which facilitates high operating security even if dirt or manufacturing tolerances are to be expected.

In a preferred embodiment of the within invention, two sensors are permanently positioned in the belt lock or in the lock casing. The providing of two sensors increases operating security in that in the event one of the sensors fails there is no unintentional assumption that the switch device is functioning properly, since the switch signal of the functioning sensor can be brought in as an additional aide to evaluating the switch condition or error function. The sensors can also be connected with a similarly advantageous permanent evaluation unit that depending on the signals or the switch conditions of the sensors reports an error or a switch situation showing that the belt is or is not fastened.

According to a preferred embodiment of the present invention, the sensors are designed as Hall probes. Such Hall probes serve as contact-free signal generators in which a tension dependent on a magnetic field can be probed.

The control element can include a magnet, preferably a permanent magnet, positioned in such manner that an interaction can be created between the magnets and the sensors designed, for example, as Hall probes. Such an arrangement of a control element with a magnet is relatively simple to manufacture, since the control element need only be positioned near the permanently positioned sensors or Hall probes and be equipped with a permanent magnet in an appropriately adjacent area. The magnets chosen must be of such size that only one of the sensors or only one of the Hall probes is appropriately acted on by a magnetic field. The presence of the magnet near one of the sensors/Hall probes leads to generation of a specific pre-programmable switch condition that is clearly dependent on a specific position of the control element and hence the position of the belt lock tongue in the belt lock. A major advantage of such an arrangement is that the electronic device consisting of sensors or Hall probes and evaluation unit can be completely sealed against external influences, since a mechanical contact between the control element and the sensor is as unnecessary as a mechanically activated switch. In the within case it is sufficient if the sensors or Hall probes are positioned in an area adjacent to the control element in different positions or to the permanent magnets installed on them.

It is particularly advantageous if the belt tongue can be fixed in the belt lock with a locking pin and the locking pink contains the control element. This guaranties optimum mechanical operating security of the entire switch device. Since the position of the locking pin can be directly determined by means of the permanent magnet or the probes, an error function can be reliably prevented by an indirect and error-affected determination of the positions of the locking pin and the control element. If the belt tongue is properly inserted into the belt lock, according to the invention the locking pin is also in a predetermined position. This position can then be correctly determined through the interaction between the control element and the sensors.

In a preferred embodiment of the present invention a form is provided to hold the sensors and the evaluation unit. The effect of such a form is to prevent the sensors from collecting dirt or being damaged by outside influences.

In a preferred embodiment of the present invention a control unit and an evaluation unit can be linked so that in the control unit the output signal of the evaluation unit can be transformed into a threshold or an error value. If because of the switch circumstances of the sensors it is determined in the evaluation unit that the belt tongue is not properly inserted in the belt lock, an appropriate signal can be transmitted to the control unit. The control unit can transform this signal into a threshold value that for example can determine delay in an accident in which an airbag is supposed to be released. If the belt is not fastened, or if the switch device is malfunctioning, this threshold value is lower than when the belt is properly fastened.

It is particularly advantageous if the control unit and the evaluation unit can be combined in one unit. If in addition the sensors according to the invention are located in this unit, the entire electronic device can be combined into a single compact structural component and if necessary can be protected against outside influences.

In a preferred embodiment of the present invention the control element is positioned on the belt lock tongue so that the position of the control element is changed by a movement of the belt lock tongue.

BRIEF DESCRIPTION OF THE DRAWINGS

Further details and advantages of the within invention are explained by means of an embodiment illustrated in the drawing showing:

FIG. 1: A Longitudinal cross-section through a seatbelt with the first and the second sensors and a control element designed as a locking pin, FIG. 2: A cross section of the seatbelt according to FIG. 1, and FIG. 3: The connection of the first and second sensors with the evaluation unit.

DESCRIPTION OF THE PREFERRED EMBODIMENTS

Figure 3:
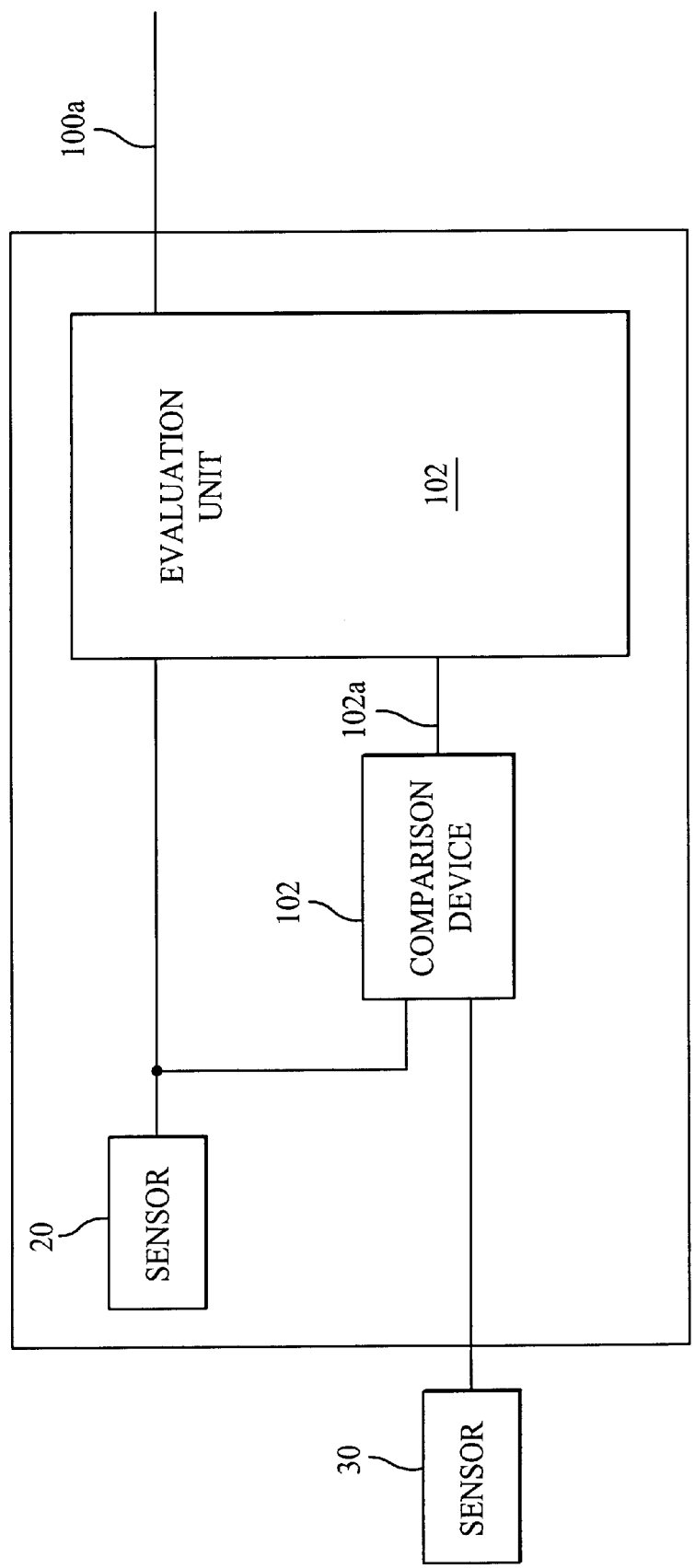

FIG. 1 and FIG. 2 show the belt lock 10, which has a cap cover 12. In the upper portion of belt lock 10 there is push button 14, illustrated in FIG. 2, that is activated by the user to loosen the belt lock tongue (not illustrated) from the belt lock 10. On the right (see FIG. 1) of cover cap 12 there are two sensors 20 and 30, advantageously designed as Hall probes, which according to FIG. 2, which illustrates a cross-section of the belt lock, are separated vertically and horizontally at intervals. According to the present embodiment the sensors 20, 30 are positioned in such manner that they can be held in an appropriately designed recess of a permanent lock part 17 (see FIG. 1), for example the cover cap 12.

The horizontal area adjacent to sensors 20, 30 in FIG. 1 contains control element 40, which is illustrated in two different positions in FIG. 1 and FIG. 2. Control element 40 includes the permanent magnet 42 as well as locking pin 44. Locking pin 44 serves as a secondary locking element, and ensures, for example by means of a bar, the secure attachment of the belt lock tongue in the belt lock 10. Magnet 42 is positioned in the end of locking pin 44, and in both positions illustrated in FIG. 1 and FIG. 2 is located directly in the area of sensors 20 or 30.

Sensors 20, 30 are linked by means of a wire 16 with an evaluation device, which is not illustrated in FIG. 1 and FIG. 2. Housing 13 in a center section of cover cap 12 serves on the one hand to guide the belt lock tongue into the belt lock 10 and on the other hand to attach the belt lock to, for example, a portion of the vehicle body. In the lower portion of housing 13 an opening 132 is provided for fastening; the corresponding attachment component can be inserted into opening 132.

FIG. 2 clarifies the arrangement of sensors 20 and 30 as well as the possible positions of control element 40 or locking pin 44 and the magnet 42 positioned in the end. FIG. 2 further clarifies the fact that wire 16 is led to the rear wall of cover cap 12.

If the belt lock tongue is not inserted into the belt lock 10, control element 40 is in the bottom position illustrated in FIG. 1 and in the left position illustrated in FIG. 2. In this position the magnet 42 attached to the locking pin 44 is immediately adjacent to the second sensor 30. If the belt lock tongue is inserted into belt lock 10, control element 40 or locking pin 44 and magnet 42 are moved along the L-shaped guide 50 shown in FIG. 2 into the top position, in which magnet 42 is now directly adjacent to the first sensor 20. The absence of magnet 42 from the area of the second sensor 30 or presence in the area of the first sensor 20 leads in each case to a change in the switch condition of sensors 20, 30, which is transmitted to the evaluation unit by means of wire 16. If the belt lock tongue is taken out of the belt lock 10, the push button 14 is activated, which creates a situation in which the control element 40 or the locking pin 44 with magnet 42 is moved from the upper locking position illustrated in FIG. 2 to the unlocked position illustrated in FIG. 2, left. During the unlocking process or the movement of the control element 40 in the L-shaped guide 50 there is another changeover of the two sensors, which leads to a characteristic switch condition of the overall switch device. The locking pin 44 is guided by means of a guide slot (not illustrated) in the push button 14 in L-shaped guide 50 in housing 13.

FIG. 3 shows the connection of sensors 20 and 30 with an evaluation unit 100. The evaluation unit 100 connected is a comparison device 102 that compares the switch conditions of the two sensors to determine the presence of an error function or a correct condition of the switch device. The system condition is transmitted to the evaluation unit 100 by means of signal 102a, and is interpreted there as correct or erroneous function of the switch device. Based on the combinations of the switch conditions of sensors 20 and 30, evaluation unit 100 determines possible positions of the switch device, which covers the conditions of "buckled," "not buckled," and "error function." These data can be transmitted to a control unit by means of a signal 100a.

The possible switch conditions of sensors 20 and 30 in normal operation and in the event of an error are illustrated in the following table. The error functions shown here include the failure of a magnet, an external interference field, and a defect in sensors 20 and 30. Columns A and B designate various possible switch conditions of the sensors or the interpretations of these conditions. Sensors 20 and 30 are designated by the abbreviations S.20 and S.30.

| Operating | | A | | B | | Interpretation | |
|---|---|---|---|---|---|---|---|
| mode | Condition | S.20 | S.30 | S.20 | S.30 | A | B |
| normal | not buckled | 0 | 1 | | | okay | |
|  | buckled | 1 | 0 | | | okay | |
| no magnet | not buckled | 0 | 0 | | | error | |
|  | buckled | 0 | 0 | | | error | |
| outside field | not buckled | 0 | 0 | 1 | 1 | error | error |
|  | buckled | 0 | 0 | 1 | 1 | error | error |
| S.20 defect | not buckled | 0 | 1 | 1 | 1 | okay | error |
|  | buckled | 0 | 0 | 1 | 0 | error | okay |
| S.30 defect | not buckled | 0 | 0 | 0 | 0 | error | okay |
|  | buckled | 1 | 0 | 1 | 1 | okay | error |

In unbuckled condition, in normal operation, the switch device of sensor 20 is in switch condition "0," while sensor 30 assumes switch condition "1." When the belt lock tongue is inserted in the belt lock the magnet 42 is moved appropriately, and the two sensors change over to conditions "1" and "0." A divergence from this normal condition to the error functions illustrated can be recognized from the fact that in the event of an error function in any given position of the sensors according to column A or column B for both sensors 20 and 30 the same switch condition is reported. A defect of sensor 30, for example, when the belt is buckled (last line of the table) can be determined by reason of the fact that in the condition according to column A different switch conditions are found for sensors 20 and 30, whereas according to column B the same values "1" and "1" are found for both sensors, which accordingly leads to an error report. A situation in which the condition shown in the last line of column A for sensors 20 and 30 cannot be confused with the normal condition of the two sensors, since here in both cases the switch positions "1" and "0" are found, is thereby avoidable. In the situation according to column B it is clear that both sensors 20 and 30 now assume switch conditions "1," which results in an error report.

According to the embodiment illustrated above, by means of the switch device according to the invention a secure and unmistakable recognition of an error function and the condition of the seatbelt is recognizable. Based on the design of the switch elements as sensors a particularly reliable and functionally secure method of working is thus achieved.

What is claimed is:

1. Switch device for controlling locking position of an automobile seatbelt lock (10) having at least two switch elements with determinable switch condition, as well as a movable control element (40) in the seatbelt lock (10) and from which the switch condition of the switch elements are changeable,
   wherein the switch elements are sensors (20,30) and the switch condition of the switch elements is changeable by an interaction between the control element (40) and the sensors (20,30), and
   one of said sensors (20) is structured and arranged to register a binary switch condition "1" and the other (30) of said sensors register a binary switch condition "0" in locked condition, and said one sensor (20) register the binary switch condition "0" and said other sensor (30) register the binary condition "1" in unlocked condition, such that when said sensors (20,30) both register the same binary switch condition "0" or "1", an error signal is generated.

2. Switch device according to claim 1, wherein the control element (40) and the sensors (20,30) are structured and arranged such that a contact-free interaction between the control element (40) and the sensors (20,30) is created.

3. Switch device according to claim 1, wherein there are two sensors (20,30) positioned permanently in the belt lock (10).

4. Switch device according to claim 1, wherein the sensors (20, 30) are designed as Hall probes.

5. Switch device according to claim 1, wherein the control element (40) includes a magnet (42) positioned to interact with the sensors (20,30) by movement between two positions.

6. Switch device according to claim 1, wherein said control element (40) comprises a locking pin (44) positioned such that a belt lock tongue is fixable in the belt lock (10) by the locking pin (44).

7. Switch device according to claim 1, wherein a housing (17) is provided in which the sensors (20,30) and an evaluation unit (100) for determining the switch condition are retainable.

8. Switch device according to claim 1, additionally comprising a control unit and an evaluation unit (100) which are connectable, with said evaluation unit (100) coupled to said sensors (20,30) such that in the control unit, an output signal of the evaluation unit (100) is transformable into a threshold value or an error datum.

9. Switch device according to claim 8, wherein the control unit and the evaluation unit (100) are combinable in a single unit.

10. Switch device according to claim 1, wherein the control element (40) is positioned on a belt lock tongue.

11. Switch device according to claim 5, wherein the magnet (42) is a permanent magnet.

12. Switch device according to claim 2, wherein there are two sensors (20,30) positioned permanently in the belt lock (10).

13. Switch device for controlling locking position of an automobile seatbelt lock (10) having at least two switch elements with determinable switch condition, as well as a movable control element (40) in the seat belt lock (10) and through which the switch conditions of the switch elements are changeable,
   wherein the switch elements are sensors (20,30) and the switch condition of the switch elements is changeable by an interaction between the control element (40) and the sensors (20,30), and
   the sensors (20,30) are arranged in an L-shaped relationship with respect to one another and additionally comprising an L-shaped guide (50) in which the control element (40) is arranged to move between said two sensors (20,30) and substantially perpendicular to scanning direction of each sensor (20,30), such that said control element (40) is positioned within scanning area of one (20) of said two sensors (20,30) in unlocked position and the other (30) of said two sensors (20,30) in locked position.

14. Switch device according to claim 13, wherein one of said sensors (20) is structured and arranged to register a binary switch condition "1" and the other (30) of said sensors register a binary switch condition "0" in locked condition, and said one sensor (20) register the binary switch condition "0" and said other sensor (30) register the binary condition "1" in unlocked condition, such that when said sensors (20,30) both register the same binary switch condition "0" or "1", an error signal is generated.

15. Switch device according to claim 14, wherein the control element (40) includes a magnet (42) positioned to interact with the sensors (20,30) by movement between said two positions.

16. Switch device according to claim 15, additionally comprising a locking pin (44) on which said control element (40) is mounted and which is fixable in the belt lock (10) between the two positions by insertion and removal of a belt lock tongue.

17. Switch device according to claim 1, additionally comprising a locking pin (44) on which said control element (40) is mounted and which is fixable in the belt lock (10) between the two positions by insertion and removal of a belt lock tongue.

18. Switch device according to claim 15, wherein the magnet (42) is a permanent magnet.

* * * * *